United States Patent [19]

Young

[11] 4,407,562
[45] Oct. 4, 1983

[54] OPTICAL FIBER SWITCH

[75] Inventor: William C. Young, Middletown, N.J.

[73] Assignee: Bell Telephone Laboratories, Incorporated, Murray Hill, N.J.

[21] Appl. No.: 432,254

[22] Filed: Oct. 1, 1982

Related U.S. Application Data

[63] Continuation of Ser. No. 210,013, Nov. 24, 1980, abandoned.

[51] Int. Cl.³ ................................................ C02B 7/26
[52] U.S. Cl. ................................................ 350/96.20
[58] Field of Search .................. 350/96.2, 96.21, 96.22

[56] References Cited

U.S. PATENT DOCUMENTS

| | | | |
|---|---|---|---|
| 3,864,018 | 2/1975 | Miller | 350/96.21 |
| 4,033,669 | 7/1977 | Hanson | 350/96.20 |
| 4,046,454 | 9/1977 | Pugh | 350/96.22 |
| 4,220,396 | 9/1980 | Antell | 350/96.15 |

Primary Examiner—Eli Lieberman
Attorney, Agent, or Firm—David R. Padnes

[57] ABSTRACT

Switching between optical fibers is achieved through the use of a fixed (101) and a moveable (102) housing disposed within a slotted support member (103, 205). The fixed and moveable housings respectively contain first (104, 105) and second (108) sets of optical fibers. Each housing has two grooved (204) and parallel exterior surfaces. Both housings are disposed in substantial abutment to one another in the slotted support member with both sets of optical fibers parallel to one another. The sidewalls of the slot are grooved to be the mating opposite of the grooved housing surfaces. The first housing is fixedly positioned in the slot by the mutual engagement of the grooved exterior housing surfaces and the grooved sidewalls. Switching between optical fibers is accomplished by the translation of the moveable housing surfaces to either of two positions which axially aligns a predetermined number of optical fibers in the first and second sets. Each position of the moveable housing is precisely determined by the engagement of one grooved exterior housing surface and one grooved sidewall.

13 Claims, 4 Drawing Figures 4,407,562

OPTICAL FIBER SWITCH

This is a continuation of application Ser. No. 210,013, filed Nov. 24, 1980, now abandoned.

TECHNICAL FIELD

The present invention relates to optical transmission systems and, more particularly, to a switch for switching an optical signal between optical fibers.

BACKGROUND OF THE INVENTION

The use of optical fibers in telecommunications applications requires the ability to switch an optical signal between optical fibers with low loss over a varying number of switch cycles. The optical fibers may be either monomode or multimode fibers. Monomode fibers have a light transmitting core approximately one-tenth the diameter of multimode fibers. Monomode fibers, however, exhibit lower signal losses per unit distance than multimode fibers and are, therefore, more desirable in long-haul optical transmission systems. The number of switching cycles for either type of optical fiber can vary from one or two to several thousand in the switch service life. A high degree of reliability is particularly important in many applications, such as undersea fiber transmission systems, where the optical switch is not readily repaired or replaced.

The switching function in optical fiber switches is typically accomplished through the use of an optical device and/or fiber movement. In switches utilizing an optical device, such as a lens or mirror, the optical signal is directed by the optical device between spatially separated optical fibers. Such switches typically provide satisfactory reliability but exhibit undesirable signal losses and crosstalk levels due to the optical device and the inherent separation between optical fibers. In moving fiber switches, switching is accomplished by the displacement and precise alignment of one fiber relative to another. A number of moving fiber switch designs exist which can achieve low signal losses and crosstalk levels. See, for example, U.S. Pat. No. 4,033,669 to Hanson, issued July 5, 1977 and U.S. Pat. No. 4,220,396 to Antell, issued Sept. 2, 1980. The problem with moving fiber switches, however, is that the signal loss and crosstalk level tend to increase significantly after many switch operations. Moreover, most designs are not readily adaptable for use with either multimode or monomode optical fibers.

In light of the foregoing, a moving fiber switch for either monomode or multimode fibers that exhibits low-loss over thousands of switching cycles would be extremely desirable.

SUMMARY OF THE INVENTION

In accordance with the present invention, low loss, reliable switching between either monomode or multimode optical fibers is achieved. The optical fiber switch comprises two housings which contain optical fibers. Each housing has two parallel exterior surfaces which are grooved. Both housings are located in a slotted support member with the optical fibers in each housing parallel to one another. The sidewalls of the slot are also grooved and are the mating opposite of the grooved exterior housing surfaces. One housing is fixedly positioned in the slot by the mutual engagement of the grooved exterior housing surfaces and the grooved sidewalls. Switching between optical fibers is accomplished by the translation of the second housing, in a direction substantially perpendicular to the exterior housing surfaces, to either of two positions. Each position is precisely determined by the mutual engagement of one grooved exterior surface and one grooved sidewall.

A feature of the present invention is that low optical signal loss can be maintained over several hundred thousand switching cycles.

BRIEF DESCRIPTION OF THE DRAWING

A complete understanding of the present invention may be gained from a consideration of the detailed description presented hereinbelow in connection with the accompanying figures in which.

DETAILED DESCRIPTION

Figure 1:
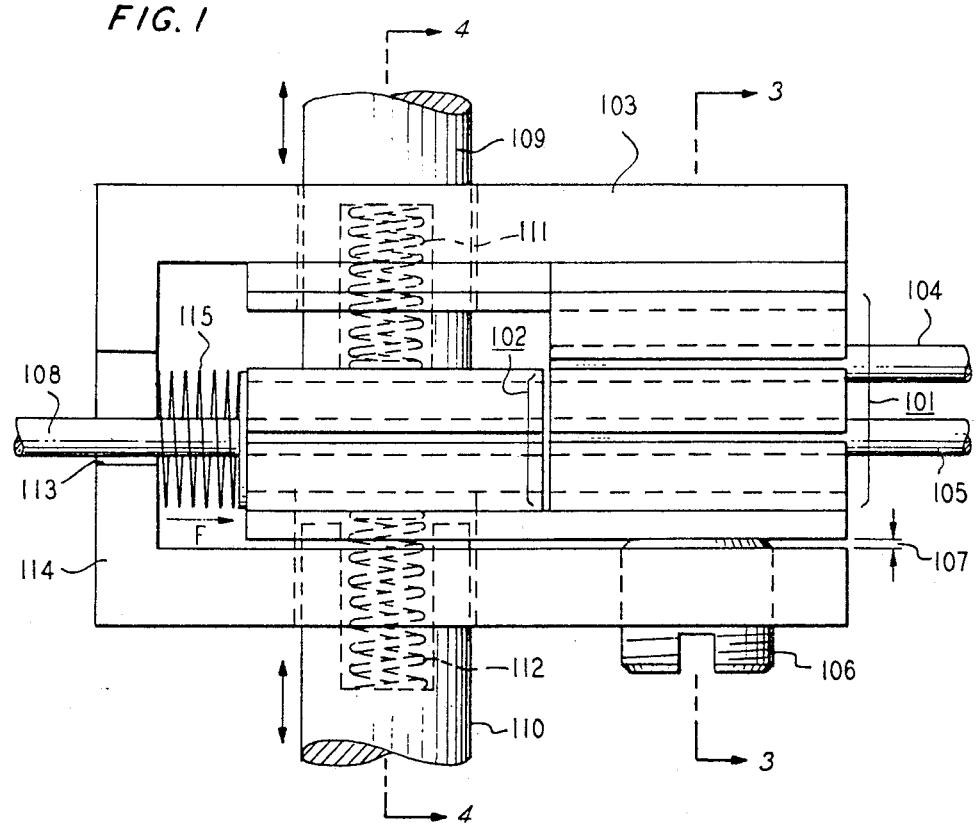
FIG. 1 is a front view of an embodiment of the present invention.
Figure 3:
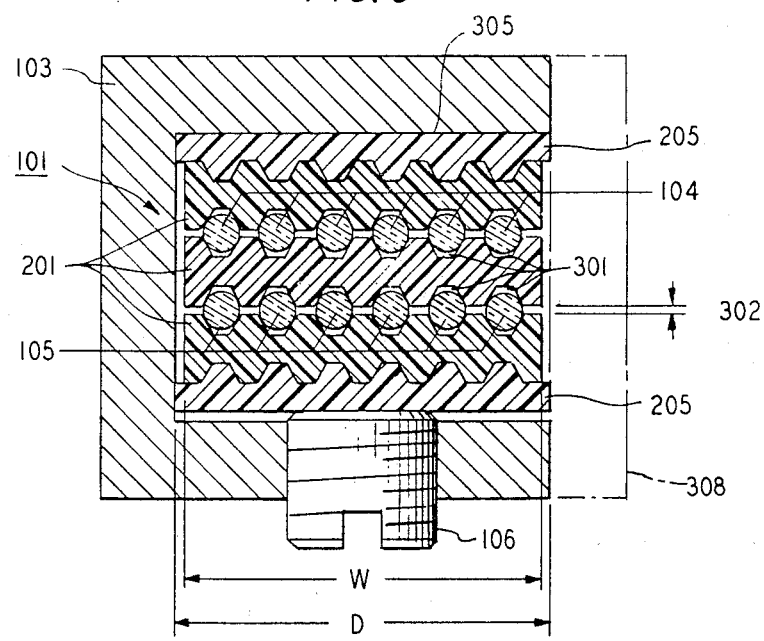
FIG. 3 is a cross-sectional view taken along line 3—3 of FIG. 1.
Figure 4:
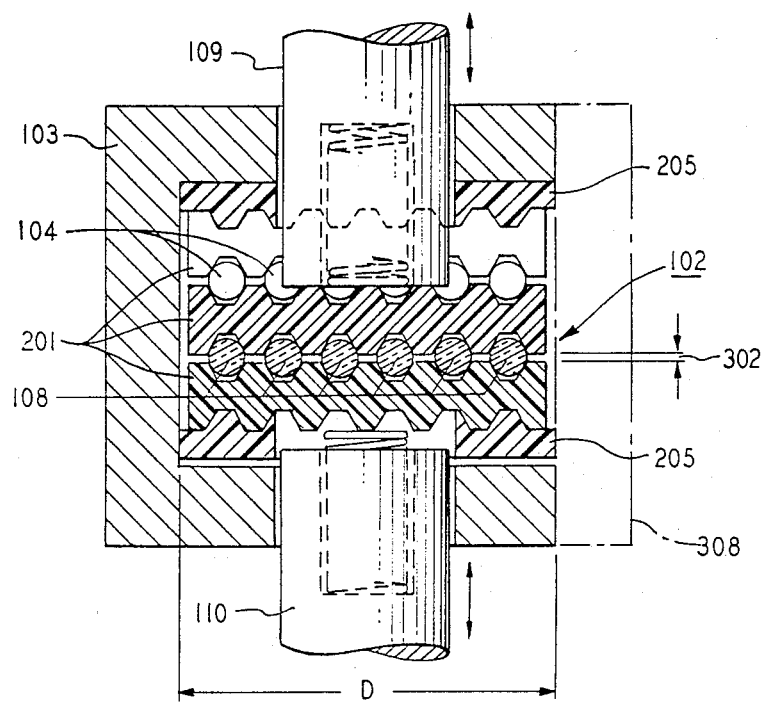
FIG. 4 is a cross-sectional view taken along line 4—4 of FIG. 1.

As shown in FIGS. 1, 3 and 4, two housings 101 and 102 are disposed in slotted support member 103. Housing 101, retaining planar arrays of optical fibers 104 and 105, is fixedly positioned in support member 103. Housing 102 retains a planar array of optical fibers 108 and is floatably mounted in support member 103 with optical fiber arrays 104, 105 and 108 parallel to one another. Array 108 passes through channel 113 in wall 114. Housing 102 is maintained in abutment with housing 101 by longitudinal force F produced by coil spring 115. (For purposes of clarity, housing 101 and 102 are shown in FIG. 1 slightly displaced from one another.) Coil spring 115 surounds array 108 and is positioned between wall 114 of support member 103 and end face 116 of housing 102. Displacement of housing 102, in a direction substantially perpendicular to fiber arrays 104, 105 and 108, to either of two positions is provided by the actuation of either solenoid 109 or 110. Both these solenoids extend through support member 103. Coil springs 111 and 112 are advantageously disposed in each said solenoid to center housing 102 within slotted member 103 when neither solenoid is actuated.

Figure 2:
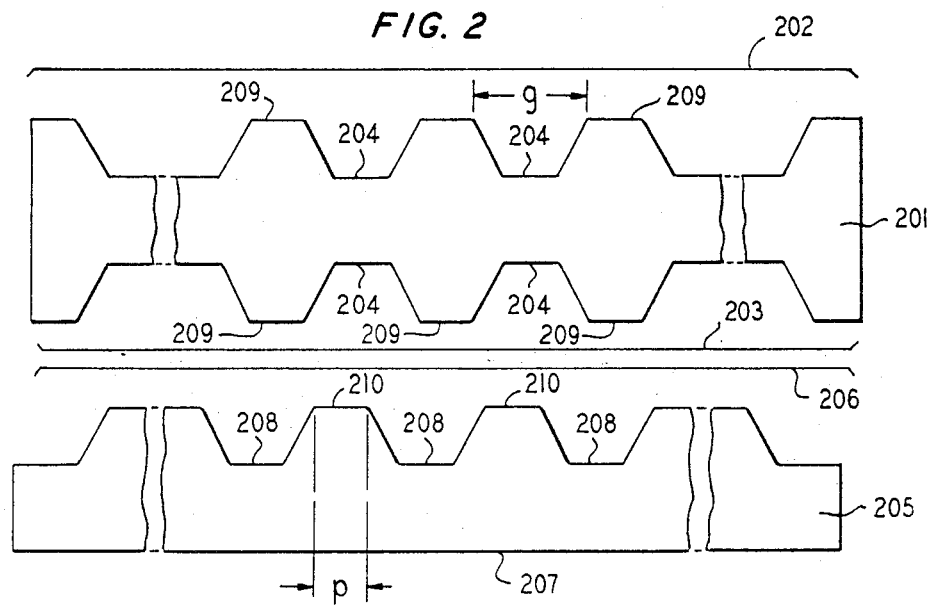
FIG. 2 is a side view of wafers used in embodiment of FIG. 1.

Housings 101 and 102 are fabricated by the stacking of thin wafer elements 201 shown in FIG. 2. Each wafer 201 has two parallel surfaces 202 and 203 with a number of longitudinal and parallel grooves 204 and flat peaks 209. Each groove has a uniform cross-section and a maximum width g. Surfaces 202 and 203 are geometrically identical as the grooves in each are in vertical alignment. To form housings 101 and 102, wafers 201 are stacked with grooves 204 in adjacent wafers aligned to form fiber receiving channels. Two wafers 205, each having parallel surfaces 206 and 207, are affixed to support member 103. Surface 206, containing grooves 208 and peaks 210, is the mating opposite of surfaces 202 and 203 in wafer 201. The minimum peak width is designated as p. Two wafers 205 along with the outermost grooved surfaces of housings 101 and 102 are not used for optical fiber retention but, as will be discussed, are used to precisely control the relative position of each housing over thousands of switching cycles.

Refer now to FIGS. 1 and 3. Housing 101 comprises three stacked wafers 201 which interleave fiber arrays 104 and 105. Housing 101 is fabricated by inserting each fiber in an array into a groove in one surface of wafer 201. A second wafer is then stacked on top the first wafer with the bottom grooves in the second wafer aligned with the top grooves in the first wafer to form fiber receiving channels 301. The fibers in the second array are then inserted into the top grooves in the second wafer followed by the alignment of a third wafer on top the second wafer to form additional fiber receiving channels 301. After stacking, epoxy is introduced between the wafers and each optical fiber end face is lapped and polished to be substantially flush with the stacked wafer end faces.

A housing support structure is assembled by bonding surface 207 of one wafer 205 to wall 305 and bonding surface 207 of a second wafer 205 to screw 106. This forms a slot with grooved and parallel sidewalls into which housing 101 is inserted. Precise positioning of housing 101 is provided by the mutual engagement of the outermost grooved surfaces of housing 101 with the mating grooved slot sidewalls. Screw 106 extends through support member 103 to assure this mutual engagement is maintained and to prevent longitudinal displacement of housing 101.

Referring to FIGS. 1 and 4, housing 102 comprises two wafers 201 which interleave fiber array 108. The two wafers 201 are stacked, as in housing 101, with the grooves in adjacent surfaces aligned to form fiber receiving channels 301. As illustrated, the fibers in array 108 are precisely axially aligned and in substantial abutment with the fibers in array 105. Precise alignment is provided by the mutual engagement of the grooves in the exterior surface of the bottommost wafer 201 of housing 102 with the mating grooves in lower wafer 205 of support member 103. These two grooved surfaces are brought into contact with one another by the actuation of solenoid 109. Alternatively, solenoid 110 may be actuated thereby aligning the fibers in array 108 with the fibers in array 104 by the mutual engagement of the grooves in the exterior surface of the topmost wafer in housing 102 with the mating grooves in the upper wafer 205 of support member 103. To maintain precise axial alignment of fiber array 108 to either fiber array 104 or 105, the difference between the depth d of the slot in support member 103 and the width w of wafer 201 is judiciously selected to be less than the maximum groove width g minus the minimum peak width p. The support housing 103 is also fitted with a cover plate 308 (shown in phantom lines in FIGS. 3 and 4). This use of a cover plate along with the aforementioned difference between slot depth and wafer width assures self-centering and complete intermeshing of the outermost grooved surfaces of housing 102 and the grooved slot side walls.

In stacking wafers 201 to form housing 101 or 102 a gap 302 exists between fiber receiving channels 301 formed by adjacently disposed grooved wafer surfaces. The groove geometry preferably is selected to maintain a gap 302 between adjacent wafers. Typically, this gap was about 38 microns (μm). Consequently, the wafers ride upon the enveloped optical fiber without coming into contact with another. If gap 302 was eliminated, some fiber would likely have leeway to move out of alignment and increase switching losses.

Switches have been constructed for optical fibers having a diameter of 110 microns (μm). Multimode fiber switches maintained an optical signal loss of less than 0.2 dB over 250,000 cycles with crosstalk levels less than −70 dB. Monomode optical fibers have also been switched with an optical signal loss of less than 0.5 dB. The switch models utilized 0.51 millimeter (mm) thick silicon wafers. The switches were extremely compact as wafers 201 and 205 were 6.30 mm and 12.70 mm, respectively. Preferential etching of the silicon was used to produce 0.050 mm deep grooves on a center-to-center spacing of 0.23 mm. The angle formed by opposing groove walls was approximately 70.5 degrees. Finally, to reduce Fresnel reflections, index matching fluid was applied to the fiber end faces during assembly.

It should, of course, be understood that while housings 101 and 102 were fabricated using three and two wafers, respectively, the housing size is adjustable. For example, the number of wafers and the number of grooves in each wafer can be adjusted to accommodate a varying number of fiber arrays as well as a varying number of optical fibers in each array. Moreover, the fabrication of each housing is not limited to the stacking of wafers. For example, precision apertures could be formed in a block of metal or plastic having two grooved and parallel exterior surfaces. In similar fashion, wafers 205 could be eliminated by the formation of grooves directly in support member 103.

What is claimed is:

1. A switch for coupling an optical signal between optical fibers characterized by first (101) and second (102) housings having a number of fiber receiving channels (301) therethrough, each housing also having two parallel exterior surfaces with a number of grooves (204) having a uniform cross-section disposed therein, the perpendicular distance between said surfaces of said first housing being greater than the perpendicular distance between said surfaces of said second housing;

first (104, 105) and second (108) sets of optical fibers respectively disposed in said fiber receiving channels in said first and second housings;

a support assembly (103, 106, 205) having a slot with grooved and parallel sidewalls which are the mating opposite of the grooved exterior housing surfaces, said first housing being fixedly positioned in said slot by the mutual engagement of the grooved exterior surfaces of said first housing and said grooved slot sidewalls, said second housing being disposed in said slot adjacent said first housing with said first and second sets of optical fibers parallel to one another; and means (109, 110) for displacing said second housing in a direction substantially perpendicular to said exterior surfaces to either of two positions which axially aligns a predetermined number of optical fibers in said first and second sets, each position being precisely determined by the mutual engagement of one grooved exterior housing surface and one grooved slot sidewall.

2. The switch of claim 1 further including means (115) to maintain said first and second housings in substantial abutment.

3. A switch for coupling an optical signal between optical fibers characterized by first (101) and second (102) stacks respectively comprising m and n stacked wafers (201), where m and n are integers greater than two and m>n, each wafer having two parallel surfaces (202, 203), each surface having a number of spaced parallel grooves (204) which are aligned with the grooves in an adjacent wafer surface to form fiber receiving channels (301);

first (104, 105) and second (108) sets of optical fibers respectively disposed in said fiber receiving channels of said first and second stacks;

a support assembly (103, 205, 106) having a slot with grooved and parallel sidewalls which are the mating opposite of the grooved wafer surfaces, said first stack being fixedly positioned in said slot by the mutual engagement of the grooves in the outermost surfaces of said first stack and said grooved sidewalls, said second stack being located in said slot adjacent said first stack with the optical fibers in said first and second stacks being parallel to one another, and means (109, 110) for displacing said second stack in a direction substantially perpendicular to said wafer surfaces to either of two positions, each position axially aligning a predetermined number of fibers in said first stack with the optical fiber in said second stack, each position being precisely determined by the mutual engagement of one outermost grooved surface of said second stack and one grooved sidewall.

4. The switch of claim 3 further including means (115) to maintain said first and second stacks in substantial abutment.

5. The switch of claim 1 wherein said first and second sets of optical fibers each comprise at least one optical fiber.

6. The switch of claim 5 wherein said number of grooves is at least one.

7. The switch of claim 1 wherein said number of grooves is at least one.

8. The switch of claim 3 wherein said first and second sets of optical fibers each comprise at least one optical fiber.

9. The switch of claim 8 wherein said number of grooves is at least one.

10. The switch of claim 3 wherein said number of grooves is at least one.

11. A switch for selectively aligning discrete optical fibers characterized by first and second housings having a number of fiber receiving channels therethrough, the channels in the first and second housings adapted to receive optical fibers, each housing also having two parallel exterior surfaces with at least one groove therein, the perpendicular distance between said surfaces of said first housing being greater than the perpendicular distance between said surfaces of said second housing, a support assembly having a slot with grooved and parallel surfaces serving to mate with the grooved exterior housing surfaces, said first housing being fixedly positioned in the slot by the mutual engagement of the grooved exterior surfaces of the first housing and the grooved slot surfaces, said second housing being disposed in the slot adjacent said first housing with the fiber receiving channels in each housing being parallel to each other, and means for displacing the second housing in a direction substantially perpendicular to the exterior surfaces to either of two positions, each position axially aligning a predetermined number of fiber receiving channels in said first and second housings, each position being precisely determined by the mutual engagement of a grooved exterior housing surface and a respective grooved slot surface.

12. A switch according to claim 11 further characterized by means for maintaining said first and second housings in substantial abutment.

13. A switch according to claim 11 or 12 characterized in that the first and second housings comprise first and second stacks of m and n wafers, respectively, where m and n are integers greater than two and m>n, each wafer having a number of spaced parallel grooves aligned with the grooves in an adjacent wafer surface to form the fiber receiving channels, and wherein the outermost grooved wafer surfaces provide said grooved exterior housing surfaces.

* * * * *